2 Sheets—Sheet 1.

L. H. HALL.
Hoisting-Machine.

No. 9,095. Reissued Feb. 24, 1880.

WITNESSES:
Jas. E. Hutchinson.
Henry C. Hazard

INVENTOR.
Leonard H. Hall
by Jno K. Mullock
Atty.

2 Sheets—Sheet 2.

L. H. HALL.
Hoisting-Machine.

No. 9,095. Reissued Feb. 24, 1880.

WITNESSES.
Jas. E. Hutchinson.
Henry C. Hazard.

INVENTOR.
Leonard H. Hall
by Jas K. Hallock
Att'y.

UNITED STATES PATENT OFFICE.

LEONARD H. HALL, OF ERIE, PENNSYLVANIA.

HOISTING-MACHINE.

SPECIFICATION forming part of Reissued Letters Patent No. 9,095, dated February 24, 1880.

Original No. 210,850, dated December 17, 1878. Application for reissue filed January 24, 1880.

*To all whom it may concern:*

Be it known that I, LEONARD H. HALL, of Erie, in the county of Erie and State of Pennsylvania, have invented a new and useful Hoisting-Machine; and I do hereby declare the following to be a full, clear, and exact description thereof.

My invention relates to the construction of hoisting-cranes for use on docks, &c.

My invention consists in the construction of the means for swinging the crane, and also various details about the machine.

Figure 1:
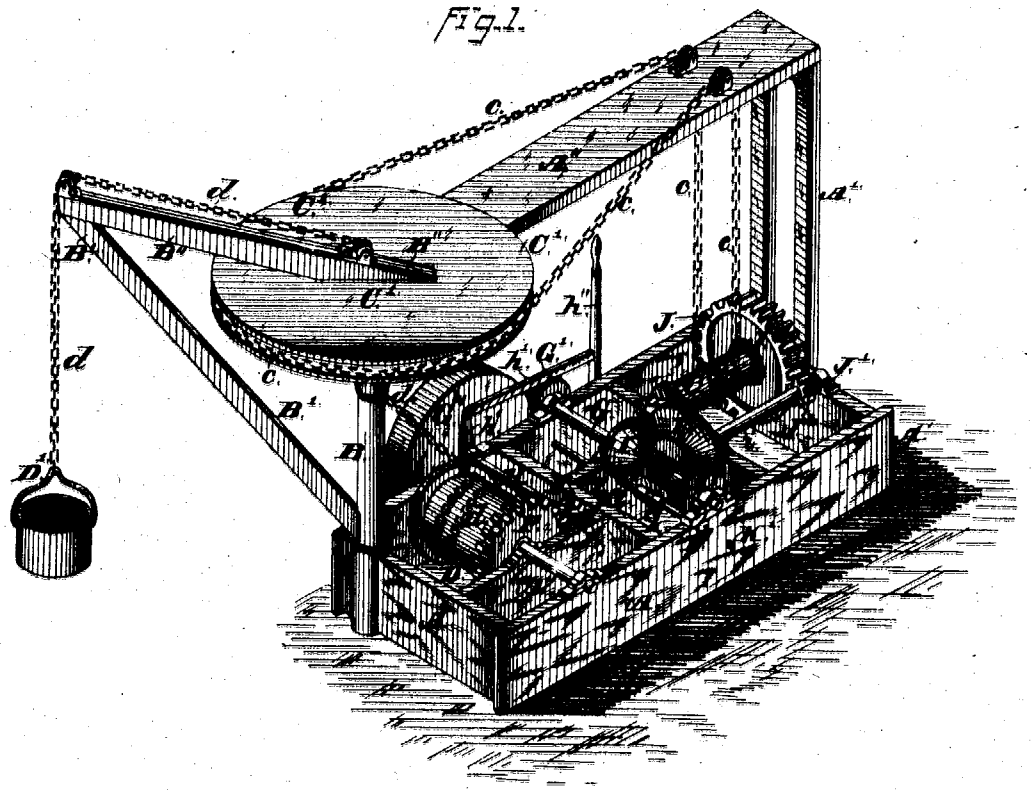
Figure 2:
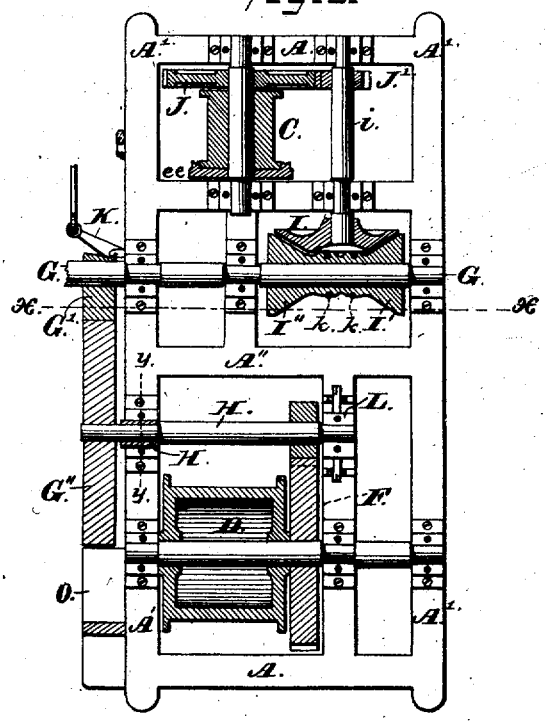
Figure 3:
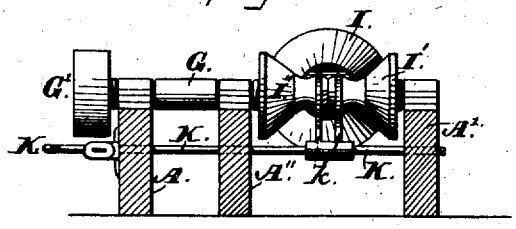
Figure 4:
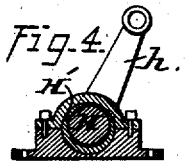

My device is shown in the accompanying drawings, as follows, (there being two sheets, Sheet 1 containing Figure 1, and Sheet 2 containing Figs. 2, 3, and 4:) Fig. 1 is a perspective view of the hoisting-machine. Fig. 2 is a horizontal section through the axis of the shafts. Fig. 3 is a transverse vertical section on the line *x x*, Fig. 2, and shows the parts beyond in elevation. Fig. 4 is a transverse vertical section of a journal-box on the line *y y*, Fig. 2.

The parts are designated by letters, as follows: A A′ A″ represent a frame-work. B B′ B″ represent the crane. C C′ are the drums, and *c* the chain by which the crane is swung. D is the main hoisting-drum or windlass. D′ is the bucket or object to be raised, and *d* is the hoisting-chain.

The main shaft of the machine, or the one which communicates with the engine, is marked G. All the other parts of the machine receive their motion from the shaft G. I provide friction-wheels for communicating this motion. The friction-wheel G′ operates upon the friction-wheel G″, which revolves the shaft H, which gears with the windlass D by the wheels F′ F, and thus operates the hoisting device proper. The friction-wheel G″ is movable, so as to throw it in and out of gear with the wheel G′. *h*, *h′*, and *h″* are the levers and connections by which the wheel G″ is moved.

These parts accomplish this result as follows: The lever *h* is connected with an eccentric journal-box, H′, in which the shaft H is journaled, (see Fig. 4,) so as this lever is thrown forward or back, so is the shaft H and wheel G″ moved. The opposite end of the shaft H is journaled in a swiveled journal-box, L. In this manner the shaft H is always truly journaled, no matter at what point it sets. The shaft H is always in gear with the windlass D by the wheels F′ F, and hence the wheel G″ revolves, whether the object D′ is being hoisted or lowered; and the lever *h* can throw the wheel G″ against the dead friction-block O, as well as against the live friction-wheel G′. So the operator at the lever *h″* can regulate the speed of the downward movement as easily as he can throw the machine in gear for hoisting.

The device for turning the crane consists of a drum or pulley, C′, on the mast or post B, a drum or winch, C, and an endless chain, *c*, connecting the two.

This device is operated by being connected with the shaft G by a friction device, which is constructed and operates as follows: The winch C receives its motion directly from a shaft, *i*, which is parallel with it, and is provided with a pinion, J′, which gears into another pinion, J, on the winch. The opposite end of the shaft *i* is provided with a conical friction-wheel, I. The shaft G is provided with two cones, I′ I″, which are joined so as to form one solid spool, the two frustums having their small ends toward each other. This device, by a spline-and-groove arrangement, slides on the shaft G and revolves with it.

By means of yokes *k k*, sliding bar K′, and lever K, either of these frustums I′ or I″ can be thrown into gear with the frustum I, and in this manner the winch C can be revolved in either direction at pleasure, and thus the crane can be swung in either direction by the operator moving the lever K as he desires; or by setting the lever K properly, so that there is no contact between the wheel I and either of the wheels or frustums I′ or I″, the crane will not move at all one way or the other.

The shaft G, on which the friction-gears G′ and I′ I″ are placed, is, in effect, an extension of the shaft of the engine which propels the hoisting-machine.

By the use of the friction-gears I′ I″ the swinging drum C can be thrown into operation at any time without shutting down the engine, while if clutches and cogged gearing were used the engine would have to be stopped, or the gearing or clutches would be broken by the sudden engagement of parts.

By the use of the two levers *h″* and K the operator can raise and swing, or lower and swing, or raise or swing alone, at pleasure, without altering the speed or reversing the engine.

What I claim is as follows:

1. In a hoisting apparatus which has a crane adapted to be swung, the combination, with said crane, of the drum or pulley C′, chain *c*, drum C, pinions J J′, shaft *i*, and conical friction-wheels I I′ I″, constructed and operating substantially as and for the purposes mentioned.

2. In combination with the drum C, shaft *i*, and cone friction-wheel I, the shaft G, sliding double-cone friction-wheels I′ I″, yokes *k k*, sliding bar K′, and lever K, said parts being arranged and operating substantially as and for the purposes mentioned.

3. The combination, in a hoisting apparatus, of the hoisting-drum D, wheels F F′, and shaft H, which is journaled at one end in a swiveled journal-box and at the other end in an eccentric journal-box, and bears at that end a friction-wheel, G″, which operates, in conjunction with a friction-wheel, upon the main shaft, or upon a dead friction-block, O, as regulated by said eccentric journal-box H′, when moved by the lever *h*, substantially as and for the purposes set forth.

4. The combination, upon the main shaft of a hoisting apparatus, of the friction-wheel G′, for operating the hoisting-drum D, and the friction-wheels I′ I″, for operating the swinging drum C, said parts being arranged and operating substantially as and for the purposes herein set forth.

In testimony whereof I, the said LEONARD H. HALL, have hereunto set my hand.

LEONARD H. HALL.

Witnesses:
JNO. K. HALLOCK,
GEO. P. GRIFFITH.